United States Patent
Robinson

[15] 3,647,407
[45] Mar. 7, 1972

[54] METHOD FOR THE MANUFACTURE OF FLOAT GLASS

[72] Inventor: Albert Sidney Robinson, Southport, England

[73] Assignee: Pilkington Brothers Limited, Liverpool, England

[22] Filed: Mar. 3, 1969

[21] Appl. No.: 803,565

[30] Foreign Application Priority Data

Mar. 6, 1968 Great Britain.................10,937/68

[52] U.S. Cl. ..........................65/30, 65/87, 65/99 A, 65/182 R, 117/124 A
[51] Int. Cl. .........................................C03b 18/00
[58] Field of Search...................65/30, 65, 97, 99, 182; 204/DIG. 8; 117/124 A

[56] References Cited

UNITED STATES PATENTS 2,232,019  2/1941  Beckwith...........................204/206
3,215,345  11/1965  Ferguson...........................65/97 X
3,467,508  9/1969  Loukes et al......................65/99 X
3,505,047  4/1970  Plumat.............................65/30

Primary Examiner—S. Leon Bashore
Assistant Examiner—Robert L. Lindsay
Attorney—Morrison, Kennedy & Campbell

[57] ABSTRACT

Glass having a shaded characteristic, for example a shaded windscreen, is manufactured by maintaining a body of molten material for modifying the glass against a surface of the moving glass and controlling variation in the treatment of the glass in a lateral direction with respect to the direction of movement. The method involves the provision of a locating member which is shaped to maintain the molten body with a configuration in which its dimension in the direction of glass advance is widest at its center and tapers toward both its ends. The glass is subsequently cut longitudinally through its center to produce a pair of shaded component glass ribbons.

1 Claim, 3 Drawing Figures

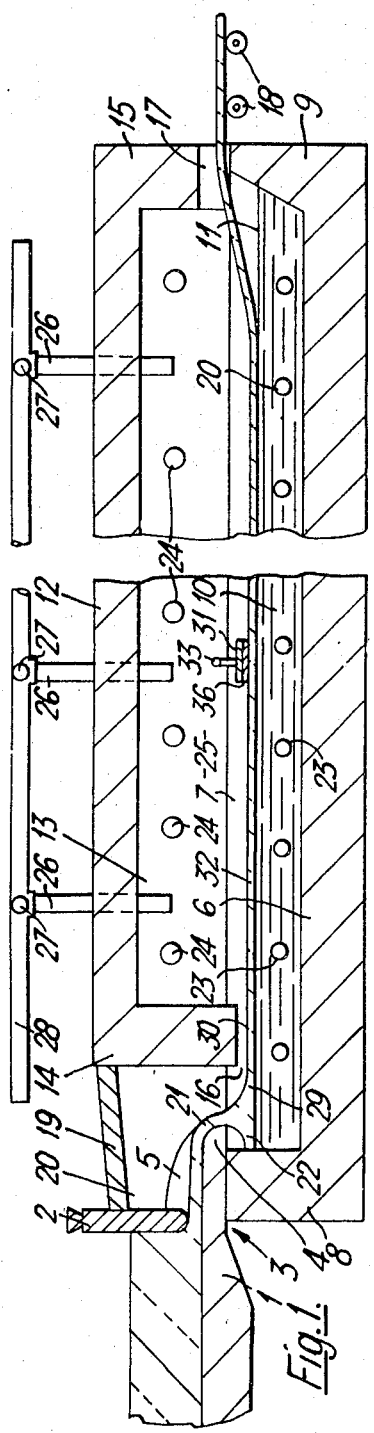
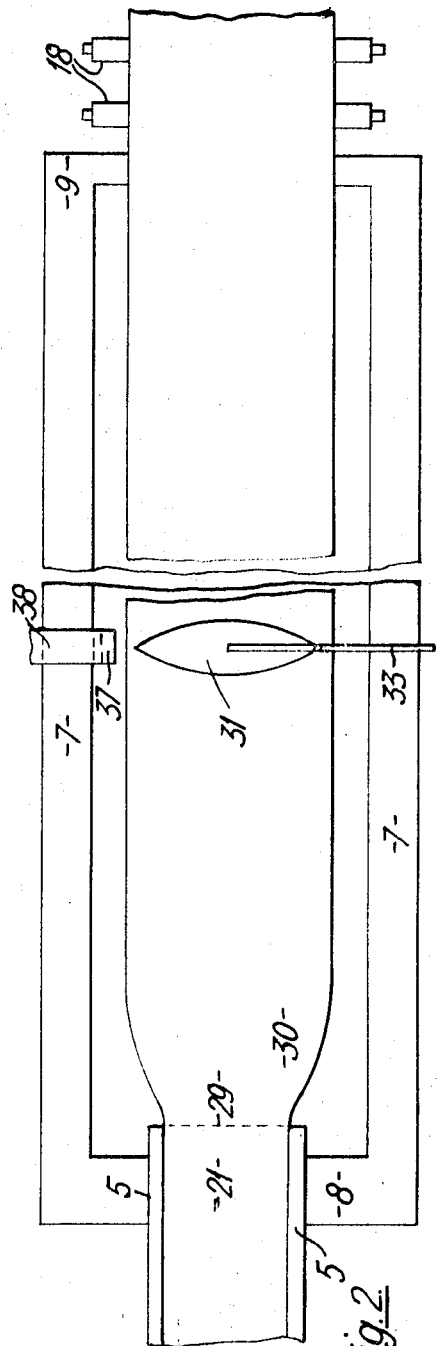
Inventor
ALBERT SIDNEY ROBINSON

METHOD FOR THE MANUFACTURE OF FLOAT GLASS

BACKGROUND OF THE INVENTION

This invention relates to the manufacture of glass having shaded characteristics, for example, glass which in different regions exhibits different transmittance or reflectivity. Such glass is particularly useful for making motor vehicle windscreens, when it can be arranged that the upper region of the windscreen transmits less light than the lower region thereof, so that solar radiation passing through the windscreen is attenuated, while forward visibility through the windscreen is virtually unimpeded.

An object of this invention is to provide an improved method and apparatus for use in the manufacture of glass having predetermined shaded surface characteristics.

SUMMARY

According to the invention a method of manufacturing glass having a shaded characteristic comprises supporting the glass to be modified, maintaining against a surface of the glass a body of molten material which is effective to produce the desired characteristics when incorporated in the glass, effecting relative movement between the glass and the body, and effecting a controlled variation of the treatment of the glass by said body in a lateral direction with respect to the direction of said relative movement, by varying in the said lateral direction the efficacy of the body of molten material to introduce said characteristics into the glass.

The preferred method of operating the invention is by maintaining a molten metal body adjacent the upper surface of an advancing ribbon of float glass by causing the body to cling to a locating member having a desired tapered shape to be imparted to the body, and causing electrolytically ionic migration from the molten metal body into the glass surface. The glass is modified so that the light transmission is a maximum in a central region of the glass and decreases towards the lateral margins of the glass, and after modification the glass is cut centrally along its length in the direction of said relative movement to provide two windscreen glasses in the lateral width of the glass.

The invention also provides apparatus for use in the manufacture of float glass having shaded characteristics, comprising glass support means, thermal regulators associated with the support means to control the temperature of the glass, means for maintaining against a heated surface of the glass an elongated molten metal which is effective to produce the desired characteristics when incorporated in the glass, means for effecting relative movement between glass supported by the support means and the body of molten material, the means for varying the treatment of the glass by said molten body laterally of the direction of said relative movement. The means for maintaining the molten body against the surface of the glass may be so shaped that the length of said body in the direction of said relative movement varies laterally of that direction toward the ends of the body.

BRIEF DESCRIPTION OF THE DRAWINGS

FIG. 1 is a sectional side elevation of apparatus according to one embodiment of the invention, including a tank structure, FIG. 2 is a plan view of the tank structure of the apparatus shown in FIG. 1 and, FIG. 3 is a diagrammatic plan view of part of the tank structure of FIG. 2, showing a locating member in accordance with one embodiment of the invention.

In the drawings, like reference numerals indicate the same or similar parts.

DESCRIPTION OF THE PREFERRED EMBODIMENTS

Figure 3:
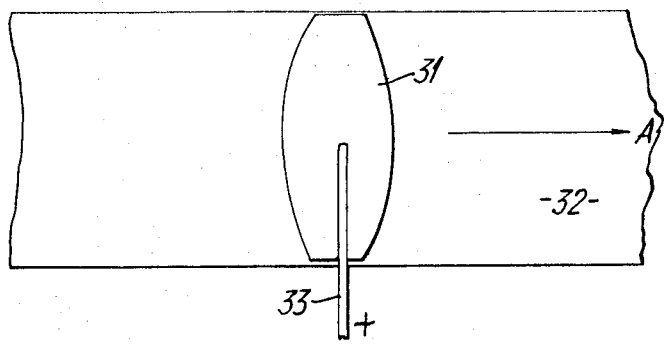

Referring to FIG. 1 and 2 of the drawings a forehearth of a continuous glass melting furnace is indicated at 1 and a regulating tweel at 2. The forehearth ends in a spout 3 comprising a lip 4 and side jambs 5 one of which is shown in FIG. 1. The lip 4 and side jambs 5 together constitute a spout of generally rectangular cross section.

The spout 3 is disposed above the floor 6 of an elongated tank structure including sidewalls 7 joined together to form an integral structure with the floor 6, an end wall 8 at the inlet end of the tank and an end wall 9 at the outlet end of the tank. The tank structure holds a bath of molten metal 10 whose surface level is indicated at 11. The bath is for example a bath of molten tin or of a molten tin alloy in which tin predominates and which has a specific gravity greater than that of the glass.

A roof structure is supported over the tank structure and the roof structure includes a roof 12, sidewalls 13 and integral end walls 14 and 15 respectively at the inlet and outlet ends of the bath. The inlet end wall 14 extends downwardly close to the surface 11 of the molten metal to define with that surface an inlet 16 which is restricted in height and through which molten glass is advanced as will be described below.

The outlet end wall 15 of the roof structure defines with the outlet end wall 9 of the tank structure an outlet 17 through which the ultimate ribbon of glass produced on the bath is discharged onto driven conveyor rollers 18 mounted outside the outlet end of the tank structure and disposed somewhat above the level of the top of the end wall 9 of the tank structure so that the ribbon is lifted clear of the wall 9 for discharge through the outlet 17.

The rollers 18 convey the ultimate ribbon of glass to an annealing lehr in well-known manner and also apply tractive effort to the ribbon of glass to assist in advancing the ribbon as it glides along the surface of the bath 10.

An extension 19 of the roof structure extends up to the tweel 2 and forms a chamber having sidewalls 20 in which the spout 3 is disposed.

Molten soda-lime-silica glass 21 is poured onto the bath 10 of molten metal from the spout 3 and the tweel 2 regulates the rate of flow of the molten glass 21 over the spout lip 4. This lip is vertically spaced from the surface 11 of the bath so that there is a free fall of the molten glass 21 through a distance of a few inches, which is exaggerated in FIG. 1, to the level of the bath surface 11. This free fall is such as to ensure the formation of a heel 22 of molten glass behind the glass 21 pouring over the spout, which heel extends back to the inlet end wall 8 of the tank structure.

The temperature of the glass as it is advanced along the bath is regulated from the inlet end down to the discharge end by temperature regulators 23 immersed in the bath 10 and temperature regulators 24 mounted in the headspace 25 defined by the roof structure over the bath. A protective gas is supplied to the headspace through ducts 26 which are provided at intervals in the roof 12. The ducts 26 are connected by branches 27 to a header 28 which is connected to a supply of protective gas and preferably the protective gas contains a reducing constituent for example a proportion of hydrogen. Thus a plenum of protective gas is maintained in the substantially closed headspace, and there is outward flow of protective gas through the inlet 16 and the outlet 17 from the headspace.

The temperature of the molten glass delivered to the bath is regulated by the temperature regulators 23 and 24 as the glass is advanced along the bath so as to ensure that a layer of molten glass 29 is established on the bath. This layer 29 is advanced through the inlet 16 and during this advance there is unhindered lateral flow of the molten glass under the influence of surface tension and gravity to the limit of free flow of the molten glass, until there is developed on the bath surface from the layer 29 a buoyant body 30 of molten glass which is then advanced in the form of a ribbon 32 along the bath 10. The width of the tank structure at the surface level of the bath 10 is greater than the width of the buoyant body 30 of molten glass so that there is no hindrance to the initial lateral flow of the molten glass.

In order to impart desired transmission or reflecting characteristics to the upper face of the ribbon 32 of glass by the method according to this embodiment of the invention, a body of molten electrically conductive material is maintained by surface tension forces against a surface of the glass and the glass is moved beneath said molten material.

A shaped electrode bar 31 is mounted transversely of the ribbon 32 of glass which is being advanced along the bath 10 of molten metal. The bar 31 is mounted just above the upper surface of the glass so that a gap, for example of about 3–4 mm., is left between the bottom of the bar and the path of travel of the upper surface of the glass. The bar 31 is maintained in position by a connection rod 33 which extends into the headspace 25 over the bath through the sidewall of the tank and is connected to the center of the bar 31. Electrical insulating means (not shown) may also be provided for assisting in locating the electrode bar 31 accurately adjacent to the upper surface of the glass ribbon 32.

The bar 31 is widest at its center and tapers away towards both ends, to give maximum treatment at the center of the ribbon, shaded away to a minimum or no treatment at the margins of the ribbon, as described below.

The rod 33, as well as serving for the mounting of the shaped electrode bar 31, is also an electrical conductor enabling electrical connection of one electrode of a DC electrical supply to the electrode bar 31.

The electrode bar 31 acts as a locating member for an elongated body 36 of molten electrically conductive material which clings to the lower surface of the bar 31 and is confined between that surface and the upper face of the glass ribbon 32. The clinging of the body 36 of molten material to the electrode bar 31 ensures the location of that body relative to the glass and prevents forward movement of the molten material with the glass.

The invention can be carried out near to the hot end of the bath as illustrated in FIGS. 1 and 2 where the temperature of the glass is for example in the range of 850° to 900° C., and where the glass is in a plastic condition.

A second electrode 37 dips into the bath of molten metal alongside the path of travel of the glass and this electrode 37 is mounted on a connection rod 38 which extends through the sidewall 7 of the tank structure and is connected to the other terminal of the electrical DC supply. Alternatively an alternating current supply may be connected across the electrode bar 31 and electrode 37.

The electrical connection to the supply circuit is in such a sense that the electrode bar 31 and the electrode 37 act effectively as the anode and cathode respectively of an electrolytic circuit comprising the electrode bar 31, the body 36 of molten material, the glass ribbon 32, the bath of molten metal 10 and the electrode 37. The passage of current through the glass ribbon 32 causes controlled migration of an element from the confined body 36 of molten material into the top surface of the glass, thereby effecting a predetermined change in the surface characteristics and therefore in the transmission characteristics, of the glass, as will be described below.

The electric current passing through the glass between the body 36 of molten material and the bath of molten metal 10 is regulated in relation to the speed of advance of the ribbon 32 of glass so that the migration and entry of an element into the top surface of the ribbon of glass can be accurately controlled, so controlling the intensity of the change in characteristic of the surface of the glass.

Many molten electrically conducting materials may be employed in the body 36 for effecting the change in transmission characteristics, the nature of the material and of the element which migrates into the top surface of the glass from that material being selected in accordance with the desired change to be induced in the transmission characteristics of the glass.

The molten electrically conductive material forming the elongated body 36 may be a metal or a metal alloy and the electrode bar 31 is preferably of a metal to which this molten metal or molten alloy clings.

A particularly efficacious "antiglare" characteristic is imparted to the glass by introducing lead and copper electrolytically into the upper face of the ribbon 32 of glass and then exposing the modified surface to a reducing atmosphere in the headspace 25 during the continued travel of the treated ribbon 32 along the bath 10 of molten metal. This induces a grey coloration and increased reflectivity into the glass. Molten lead-copper alloy is used for the body 36 of molten material and the electrode bar 31 may be of platinum or an electrode of ruthenium or of rhodium plated with platinum. Other metals which can be employed for the electrode bar 31 with lead or lead alloy as the molten material are palladium, nickel and copper. An iron electrode bar has also been found to be advantageous particularly in the form of an iron bar coated with ruthenium to which the molten lead readily clings. Further the electrode bar 31 may be of sintered iron to which the molten lead adheres. Other examples of suitable metals for the electrode bar 31 are osmium, rhodium, iridium and rhenium.

The molten metal can be introduced between the electrode bar 31 and the glass in the form of minute pellets which are fed into one edge of the body 36.

When relatively expensive metals are being employed for the locating member which have little solubility in the body of molten metal, they may be in the form of a coating on a suitable base metal or even on a refractory material. For example ruthenium may be plated onto a copper, brass or steel base, or even onto a graphite base. Alternatively ruthenium may be deposited onto a nickel base by vacuum evaporation. The electrode may be made of a composite material made from a refractory material such as alumina with a proportion of the desired metal such as ruthenium.

Other metals which may be used alone as the body of molten electrically conductive material 36 are tin, bismuth antimony, indium, zinc and thallium. Indium for example imparts a yellow coloration to the glass.

All these metals have a melting point below 1,000° C. so that they can be used over a considerable extent of the ribbon of glass advancing along the bath. When it is desired to introduce into the top face of the ribbon of glass a metal which is a highly chemically active metal, such as lithium or sodium, or a metal whose melting point is higher than the temperatures normally met with in the manufacture of flat glass on the bath of molten metal or a metal with a high-vapor pressure at bath temperatures, alloys of those metals are employed to constitute the body of molten material 36.

The solvent metal must dissolve sufficient of the solute metal to ensure that current is carried into the glass mainly by ions of the solute metal. Ideally the solvent metal is relatively inert.

Tin, bismuth or lead may be employed as the solvent metal of the alloy depending on the nature of the solute metal which is to be introduced into the glass.

For example the body 36 may be an alloy of tin with one of the following metals: lithium, sodium, potassium, zinc, magnesium, aluminum, silicon, titanium, manganese, chromium, iron and vanadium.

Bismuth is a particularly useful solvent metal and may be alloyed with any one of the metals: lithium, sodium, zinc, magnesium, aluminum, silicon, titanium, manganese, cobalt, nickel, copper, silver, gold, antimony, indium and rhenium. Bismuth dissolves at least a small amount of many high-melting point metals at the working temperatures of the bath of molten metal and is a relatively unreactive metal.

Lead can be used as the basis of an alloy with any one of the metals: lithium, sodium, zinc, magnesium, aluminum, silicon, titanium, manganese, chromium, cobalt, nickel, copper, silver, antimony, indium and rhenium.

In the embodiment of FIGS. 1 and 2 the electrode bar or retaining member 31 has a length in the direction of advance of the glass ribbon 32 (indicated by arrows A in the drawings) which varies laterally across the width of the ribbon 32. Two possible shapes for the electrode bar 31 are illustrated diagrammatically in the plan views of FIGS. 3 and 4.

In FIG. 3 the electrode bar 31 tapers from a maximum length in the direction of ribbon advance A at the center of the transverse width of the ribbon 32 to a minimum length in said direction at the edges of the ribbon 32. That is, the electrode bar 31 in plan has an oval or cigar shape in profile. Typically the electrode bar may taper from a maximum length in the direction A of 3 inches to a minimum of 1 inch at each edge of the ribbon 32.

When in use as previously described the electrode bar 31 of FIG. 3 causes the body 36 of confined molten material to have a profile in plan view which conforms to that of the bar 31. As a result the glass in the center of the ribbon 32 is in contact with and receives current from the body 36 for a longer period than the glass at the edges of the ribbon 32. Consequently the central region of the glass ribbon receives a larger quantity of the migrating element from the body 36 of molten material. The resulting glass ribbon drawn from the tank structure would have minimum transmission at its center and maximum transmission at its edges. To form glass sheets suitable for vehicle windscreens this ribbon is bisected along its longitudinal centerline, so that two component ribbons, each having a minimum transmission region along one edge, are formed: the windscreen sheets are then formed from these component ribbons, the edges exhibiting minimum transmission forming the upper edges of the windscreens.

I claim:

1. A method of manufacturing a pair of float glass component ribbons each having a shaded characteristic whereby light transmission is a minimum along one lateral margin of the ribbon and increases towards the opposite lateral margin of the ribbon, comprising advancing a ribbon of float glass along a molten metal bath, maintaining between the upper surface of the glass and an elongated locating member adjacent to but spaced from the glass an elongated molten metal body clinging to the locating member, which molten body is effective to produce the desired shading when metal therefrom is incorporated in the glass surface, the elongated locating member being shaped so that the extent of said elongated molten body in the direction of advance of the glass is greatest at the center of the molten body and tapers towards the ends of the molten body so that the step of maintaining comprises maintaining the molten body with a configuration in which its dimension in the direction of advance of the glass is widest at its center and tapers towards both ends thereof, passing electric current between the molten metal body and the bath through the thickness of the glass ribbon to enforce ionic migration from said tapered molten metal body into the glass surface, and cutting the ribbon centrally along its length in the direction of ribbon advancement.

* * * * *